United States Patent [19]

Burton

[11] 4,293,058
[45] Oct. 6, 1981

[54] BRAKE

[75] Inventor: Stanley J. Burton, Leigh-on-Sea, England

[73] Assignee: Fisco Products Limited, Essex, England

[21] Appl. No.: 92,286

[22] Filed: Nov. 8, 1979

[30] Foreign Application Priority Data

Nov. 14, 1978 [GB] United Kingdom ............... 44349/78

[51] Int. Cl.³ .......................................... B65H 75/48
[52] U.S. Cl. .................................... 188/65.1; 33/138; 242/84.8
[58] Field of Search ..................... 188/65.1, 67, 74, 75; 242/84.8; 33/138

[56] References Cited

U.S. PATENT DOCUMENTS

| | | | |
|---|---|---|---|
| 2,536,766 | 1/1951 | Pechstein | 188/67 |
| 2,680,576 | 6/1954 | Nykwest | 188/65.1 |
| 2,814,881 | 12/1957 | Ljunberg | 242/84.8 |
| 3,812,588 | 5/1974 | Bennet | 242/84.8 |
| 3,816,925 | 6/1974 | Hogan | 242/84.8 |
| 3,942,737 | 3/1976 | Rutty | 33/138 |
| 4,131,244 | 12/1978 | Quenot | 242/84.8 |

Primary Examiner—Robert R. Song

Attorney, Agent, or Firm—McCormick, Paulding & Huber

[57] ABSTRACT

A brake for a steel tape wound on a drum in a casing includes an elongate resilient brake member 12 pivotally mounted at one end in the casing. When the brake is in its curved rest condition it defines with a backing member 8 a gap through which the tape can pass when being wound on or unwound from the drum. A control knob 22 is slidably mounted in the casing to move the brake member 12 between its rest condition and a straightened operational condition in which the other end 16 of the brake member clamps the tape against the backing member 8.

In one construction, a cam 26 on the control knob 22 can be located in one or more recesses 28 in the brake member 12 to effect positive locking of the brake member. In another construction, a cam 32 on the control knob 22 is locatable in an aperture 34 in the brake member 12 when the brake member is in its rest condition, and the cam 32 is arranged to ride over a front face 36 of the aperture 34 to reduce the movement of the control knob 22 required to move the brake member 12 between its rest and operational conditions.

19 Claims, 8 Drawing Figures

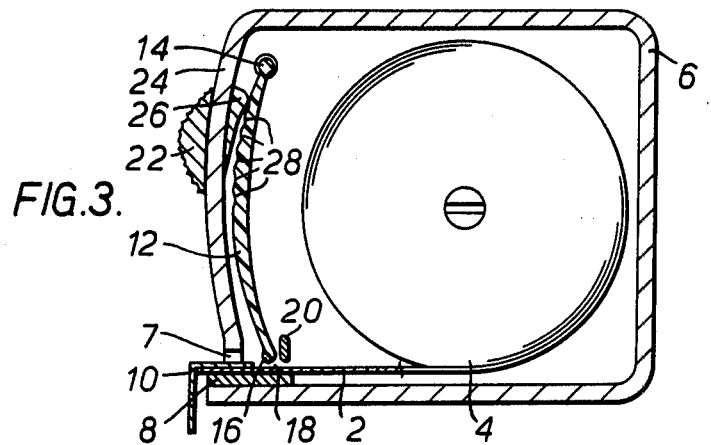
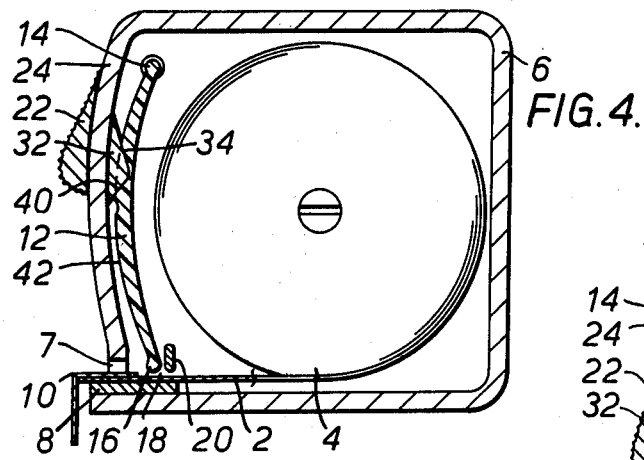
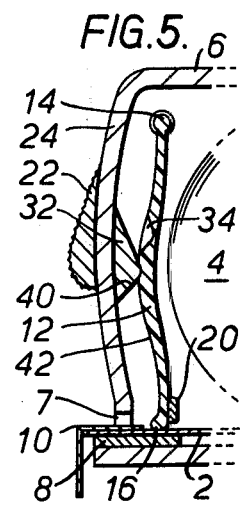

4,293,058

BRAKE

TECHNICAL FIELD

The present invention relates to a brake for an elongate member which is wound on a drum. The invention is particularly concerned with but not restricted to a brake for a drum-wound elongate member having a significant transverse dimension. One example of such an elongate member is a measuring tape adapted so that the unwound portion can be made sufficiently stiff to facilitate the taking of a measurement. The measuring tape can be made of any suitable metal or plastics material, but in this Specification such a measuring tape will be hereinafter referred to as a steel tape.

BACKGROUND ART

In order to make a measurement with a conventional drum-wound steel tape, the tape is unwound to a suitable extent, and the unwound portion is used to make the measurement. The problem arises that the tape may subsequently be inadvertently wound on or unwound from the drum thereby causing difficulty in making an accurate measurement.

STATEMENT OF INVENTION AND ADVANTAGES

It is an aim of the invention to alleviate the aforementioned problem and accordingly there is provided a brake for an elongate member wound on a drum, comprising a non-linear recoverable brake member mounted at one end and having its other end free to engage and effect braking of the elongate member; and a control member movable to a braking position to effect braking of the elongate member by an increase in the effective length of the brake member and to a brake release position at which the free end of the brake member is disengaged from the elongate member and the brake member has returned to its original condition.

In one brake of the invention, an elongate brake member may be arranged so that it is curved when its free end is disengaged from the elongate member, and is at least partially straightened when it effects braking of the elongate member. The control member may be movable linearly between said braking position and said brake release position, and the control member may include a protrusion to make contact with the brake member.

The brake member may include at least one recess to receive said protrusion when the control member is in its braking position thereby providing positive locking of the brake member. Preferably, the brake member may include a plurality of recesses to receive said protrusion; said recesses being spaced to provide progressive positive locking of the brake member.

The brake and the drum may be located in a drum casing, and in order to reduce the size of the casing for a given size of drum, the brake member may be located near a drum casing wall of corresponding curvature. The brake member may include an aperture to receive said protrusion when the control member is in its release position, and the protrusion and at least one aperture wall may be shaped so as to reduce the movement required of the control member to move the control member between said braking and release positions.

FIGURES IN THE DRAWINGS

Embodiments of the invention will now be described by way of example with reference to the accompanying illustrative drawings in which:

FIG. 1 is a side elevation, partly in section, of one brake of the invention,

FIGS. 2 and 3 are side elevations, partly in section, of two modifications of the brake of FIG. 1, FIG. 4 is a side elevation, partly in section, of another brake of the invention in the off condition, FIG. 5 is a side elevation, partly in section, of part of the brake of FIG. 4 in the on condition, FIG. 6 is a perspective view of the brake member of the brake illustrated in FIGS. 4 and 5, FIG. 7 is a front view of part of the brake member and elongate member of the brake of FIGS. 4 and 5, and FIG. 8 is a diagrammatic side elevation, partly in section, of a brake member mounting.

DETAILED DESCRIPTION OF DRAWINGS

Figure 1:
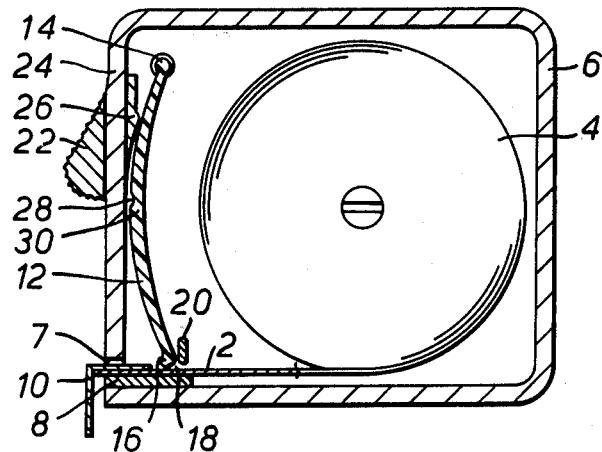
Figure 2:
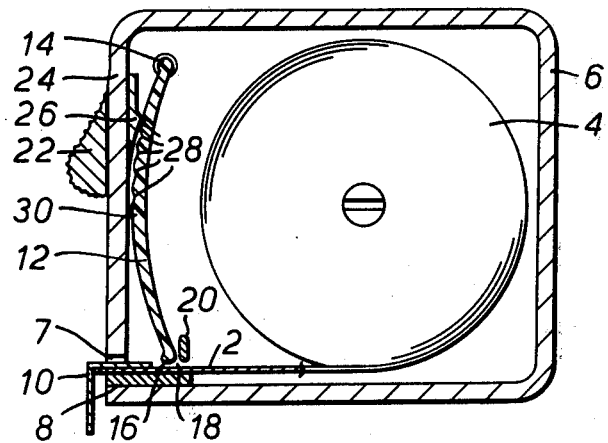

Referring to FIGS. 1 to 3, a steel tape 2 is wound on a drum 4 in a drum casing 6 having an aperture 7 through which the tape can pass. A support pad 8, forming part of the case is located on an inner face of the casing 6, and is arranged so that the tape 3 passes over this support pad 8 when passing through the aperture 7. An L-shaped end-piece 10 is secured to the end of the tape 2 so as to abut the outer face of the casing 6 adjacent to the aperture 7 to prevent the end of the tape 2 from entering the casing 6.

Figure 8:
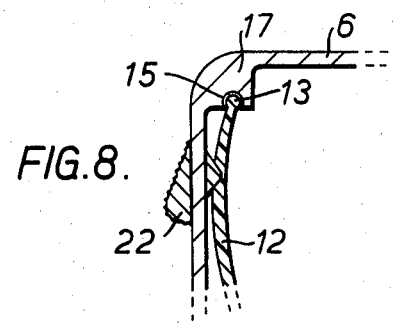

A generally rectangular elongate brake member 12 is pivotally mounted at one end to the casing 6. The brake member can be pivotally mounted on two pegs secured to the casing 6. A preferred mounting is illustrated in FIG. 8 in which a transverse cylinder 13 formed at the upper end of the member 12 is rotatable mounted in a complementary part-tubular recess 15 in a part 17 of the casing 6. This brake member 12 is made of any suitable resilient material such as for example, nylon. The brake member 12 is arranged so that when in its rest or off condition its other end 16 is spaced from the support pad 8 to define therewith a gap 18 through which the tape 2 passes when being wound on or unwound from the drum 4.

FIGS. 1 to 4 illustrate the brake member 12 in its rest position in which the brake member is curved in the form of an arc. A stop member 20 is mounted inside the casing 6 so as to be adjacent to and behind the said other end 16 of the brake member when the brake member is in its rest position. A hand-operated control knob 22 is slidably mounted in a linear slot in the wall 24 of the casing 6 which is adjacent to the brake member 12. The knob 22 and the brake member 12 are dimensioned and arranged so that when the knob 22 is in its off position, illustrated in FIGS. 1 to 4, the brake member can take up its rest condition, whereas on sliding the knob 22 downwardly it flexes the brake member into its operational condition in which its end 16 is caused to clamp the steel tape 2 against the support pad 8 to brake the tape 2. Referring particularly to FIGS. 1 to 3, when the knob 22 is moved downwardly initially it forces the brake member end 16 against the stop member 20, and then further downward movement of the knob 22 flexes the brake member 12 so that it is partially straightened. This partial straightening of the brake member 12 increases the distance between the pegs 14 and the brake member end 16 thereby causing the said end 16 to clamp the tape 2 against the support pad 8.

Referring to FIG. 1, a cam 26 and an indentation 28 are located in the control knob 22 and the brake member 12 respectively so that when the knob 22 is in its fully downward or operational position the cam 26 is located in the indentation 28 to effect positive locking of the brake member 12 in its operational or on condition. FIGS. 2 and 3 illustrate alternative constructions in which the brake member 12 has a series of longitudinally spaced indentations 28 each of which can receive the cam 26 to provide progressive positive locking of the brake member 12 in a selected one of a series of positions intermediate its fully off or rest condition and the fully on or operational condition. In order to reduce the size of the casing 6, the casing wall 24 can be made convex as illustrated in FIG. 3 with a similar radius of curvature to the brake member 12 when in its rest condition. When the knob 22 is returned to its off position the brake member 12 returns to its curved rest condition under the action of its own resilience. The thickness of the brake member 12 increases towards its centre section 30 to ensure that the brake member 12 flexes correctly under the action of the knob 22, and does not show any tendency to collapse.

Figure 6:
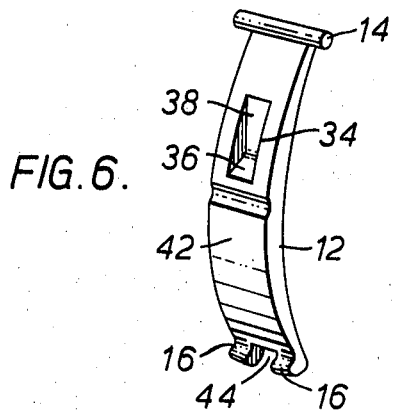

FIGS. 4 to 6 illustrate a brake of the invention which has been modified so as to reduce the movement required of the control knob 22 to move the brake member 12 between its rest and operational conditions. For clarity, corresponding components of the constructions of FIGS. 1 to 3, and 4 to 6 will be given the same reference numerals. A cam 32 is located on the rear of the control knob 22, and a recess 34 having inclined front and rear surfaces 36 and 38 is formed in the brake member 12. Referring particularly to FIGS. 4 and 5, the cam 32 and the recess 34 are dimensioned and arranged so that the cam 32 is located in the recess 34 when the brake member 12 is in its rest or off condition. On sliding the brake member 12 downwardly to its on position, a forward cam face 40 rides over the front recess surface 36 onto the front face 42 of the brake member 12 to locate the brake member 12 in its operational or on condition as illustrated in FIG. 5. It will be appreciated that the interaction of the cam face 40 and the recess surface 36 reduces the required movement of the control knob 22 to locate the brake member 12 in its operational condition. In addition, by arranging for the cam 32 to be located in the recess 32 when the brake member is in its rest condition, and by making the casing wall 24 convex it is possible to reduce the size of the casing 6.

Figure 7:
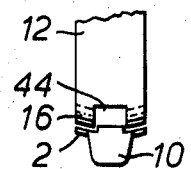

It will be appreciated that the L-shaped end-piece 10 projects slightly from the surface of the tape 2, and might possibly damage the brake member end 16. As illustrated in FIG. 7, it is possible to prevent this by arranging for the brake member 12 to have a central portion 44 cut away so as to clear the end-piece 10.

Referring to FIG. 7, it is sometimes desirable for the steel tape 2 to be curved in its transverse direction. In order to prevent any reduction in braking efficiency, the brake member end 16 can be given a corresponding curvature.

I claim:

1. A brake for an elongate member wound on a drum, comprising a control member having a cam portion, and a non-linear recoverable elongate brake member having a cam surface coactable with said cam portion, said brake member being mounted at one end and having its other end free to engage and effect braking of the elongate member; in which the control member is movable in a direction generally parallel to the elongate orientation of said brake member to a braking position to effect braking of the elongate member by an increase in the effective linear length of the brake member and to a brake release position at which the free end of the brake member is disengaged from the elongate member and the brake member has returned to its original unstrained condition.

2. A brake as claimed in claim 1, in which the brake member is curved when its free end is disengaged from the elongate member, and is at least partially straightened when it effects braking of the elongate member.

3. A brake as claimed in claim 1 or claim 2, in which the free end of the brake member reacts with a stop member.

4. A brake as claimed in claim 1, in which the brake member has an increased thickness at its centre portion.

5. A brake as claimed in claim 1, in which the control member is movable linearly between said braking position and said brake release position.

6. A brake as claimed in claim 1, in which the brake member includes at least one recess to receive said cam portion when the control member is in its braking position thereby providing positive locking of the brake member.

7. A brake as claimed in claim 6, in which the brake member includes a plurality of recesses to receive said cam portion; said recesses being spaced to provide progressive positive locking of the brake member.

8. A brake as claimed in claim 1, further including a casing for said drum, in which the brake member is a curved member located near a drum casing wall of corresponding curvature.

9. A brake as claimed in claim 1, in which the brake member includes an aperture to receive said cam portion when the control member is in its release position.

10. A brake as claimed in claim 9, in which the cam portion and at least one aperture defined by the brake member are shaped to reduce the movement required of the control member to move the control member between said braking and release positions.

11. A brake as claimed in claim 1, in which the elongate member is curved in its transverse direction.

12. A brake as claimed in claim 11, in which the free end of the brake member has a corresponding curvature to said elongate member.

13. A brake as claimed in claim 1, in which an end piece is mounted on an end of the elongate member, and the portion of the brake member adjacent to the elongate member has a cut-out portion shaped to clear said end-piece.

14. A brake as claimed in claim 1, in which said elongate member comprises a steel tape.

15. A brake as claimed in claim 1, further including a casing, and in which said brake member is mounted in said casing, and said control member is slidably mounted on said casing.

16. A brake as claimed in claim 15, in which said brake member has a portion of increased thickness defining said cam surface.

17. A brake as claimed in claim 4 in which said cam surface is defined by said centre portion.

18. A brake as claimed in claim 1, which includes a casing having an outer wall, and in which said drum is contained within said casing, said brake is contained within said casing between said drum and said outer wall, and said control member is slidably supported on said outer wall, said brake member having a portion thereof movable inwardly and in the direction of said drum in response to movement of said control member to its braking position.

19. A brake as claimed in claim 18 which includes a stop member mounted in fixed position in said casing near said other end and engageable with the inner surface of said other end when said control member is in its braking position.

* * * * *